(12) United States Patent
Otake

(10) Patent No.: US 9,868,307 B2
(45) Date of Patent: Jan. 16, 2018

(54) PRINTING APPARATUS AND PRINTING METHOD

(71) Applicant: SEIKO EPSON CORPORATION, Tokyo (JP)

(72) Inventor: Masahisa Otake, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/292,290

(22) Filed: Oct. 13, 2016

(65) Prior Publication Data

US 2017/0120640 A1     May 4, 2017

(30) Foreign Application Priority Data

Oct. 30, 2015 (JP) ................................ 2015-214618

(51) Int. Cl.
*B41J 23/00* (2006.01)
*B41J 25/00* (2006.01)

(52) U.S. Cl.
CPC .................... *B41J 25/006* (2013.01)

(58) Field of Classification Search
None
See application file for complete search history.

(56) References Cited

U.S. PATENT DOCUMENTS

| 2011/0138608 A1 | 6/2011 | Tanase et al. | |
| 2011/0141179 A1* | 6/2011 | Hara | B41J 2/2103 347/15 |
| 2014/0085364 A1 | 3/2014 | Otake | |

FOREIGN PATENT DOCUMENTS

| EP | 1216154 A1 | 6/2002 |
| JP | 2007-030503 A | 2/2007 |
| JP | 2011-121249 A | 6/2011 |
| JP | 2014-097650 A | 5/2014 |

OTHER PUBLICATIONS

The Extended European Search Report for the corresponding European Application No. 16196229.5 dated Jan. 1, 2017.

* cited by examiner

*Primary Examiner* — Erica Lin
(74) *Attorney, Agent, or Firm* — Global IP Counselors, LLP

(57) ABSTRACT

A printing apparatus includes a carriage unit, and carries out printing on a recording medium while transporting the recording medium. The carriage unit includes a first head that discharges an ink and a second head that discharges an ink of the same color, and the second head is disposed so as to be adjacent to the first head in an x axis direction, and to overlap with the first head in a y axis direction. In an outgoing path in the reciprocation of the carriage unit, a printing density of a first image, which the first head prints, gradually decreases toward an upstream side in a transport direction of the recording medium, and the first image includes a dot group, in which at least two dots formed using the ink from the first nozzles are linked to one another in the x axis direction. In addition, in a return path in the reciprocation of the carriage unit, the second nozzles print a second image, which supplements a decrease in the printing density of the first image.

6 Claims, 3 Drawing Sheets

PRINTING APPARATUS AND PRINTING METHOD

BACKGROUND

1. Technical Field

The present invention relates to a printing apparatus and a printing method.

2. Related Art

A printing apparatus that carries out printing on a sheet form recording medium having a flexible property, using an ink jet method, is known. This kind of a printing apparatus is generally provided with a plurality of printing heads, which discharge ink onto a recording medium. These printing heads are arranged so that portions of adjacent printing heads overlap in an arrangement direction thereof.

In overlapping regions of printing heads, an image is completed using ink discharged from both adjacent printing heads.

However, in overlapping regions of this kind of printing apparatus, there is a problem in that variations in density occur due to shifting of landing positions.

In order to solve such a problem, an attempt has been made to generate printing pixels, which overlap with printing pixels of a printing head that discharges ink first among adjacent printing heads, inside printing pixels of a printing head that discharges ink later (for example, JP-A-2011-121249).

However, in the above-mentioned method, it is not possible to sufficiently suppress the occurrence of variations in density due to the shifting of landing positions, and in particular, it is difficult to suppress the occurrence of variations in density in a transport direction of a recording medium.

SUMMARY

An advantage of some aspects of the invention is to provide a printing apparatus and a printing method that can sufficiently suppress the occurrence of variations in density due to the shifting of landing positions.

The advantage can be achieved by the following invention.

According to an aspect of the invention, there is provided a printing apparatus that carries out printing by discharging an ink onto a recording medium while transporting the recording medium, the printing apparatus includes a carriage unit that is disposed facing the recording medium, and that reciprocates in a main scanning direction, which intersects a transport direction of the recording medium, the carriage unit includes a first head, which includes a plurality of first nozzles that are arranged in the transport direction of the recording medium and discharge the ink, and a second head, which includes a plurality of second nozzles that are arranged in the transport direction of the recording medium and discharge ink of the same color as the first nozzles, the second head is disposed so as to be adjacent to the first head in the main scanning direction, and to overlap with the first head in the transport direction of the recording medium, in an outgoing path in the reciprocation of the carriage unit, a printing density of a first image, which the first head prints on the recording medium, gradually decreases toward an upstream side in the transport direction of the recording medium, and the first image includes a dot group, in which at least two dots formed using the ink that is discharged from the first nozzles are linked to one another in the main scanning direction, and in a return path in the reciprocation of the carriage unit, the second nozzles print a second image, which supplements a decrease in the printing density of the first image, on the recording medium.

In this case, it is possible to sufficiently suppress variations in density due to shifting of landing positions in the main scanning direction and the transport direction.

In the printing apparatus, it is preferable that the second image includes a dot group, in which at least two dots formed using the ink that is discharged from the second nozzles are linked to one another in the main scanning direction.

In this case, it is possible to more reliably suppress variations in density due to shifting of landing positions in the main scanning direction.

In the printing apparatus, it is preferable that, in a region in which the first head and the second head overlap, a third image, which the first head prints on the recording medium, and a fourth image, which the second head prints on the recording medium, in either the outgoing path or the return path, have the same printing densities in the main scanning direction and supplement one another, that the third image includes a dot group, in which at least two dots formed using the ink that is discharged from the first nozzles are linked to one another in the main scanning direction, and that the fourth image includes a dot group, in which at least two dots formed using the ink that is discharged from the second nozzles are linked to one another.

In this case, it is possible to further reliably suppress variations in density due to shifting of landing positions in the main scanning direction.

According to another aspect of the invention, there is provided a printing method that carries out printing on a recording medium using the printing apparatus.

In this case, it is possible to sufficiently suppress variations in density due to shifting of landing positions in the main scanning direction and the transport direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a printing apparatus and a printing method of the invention will be described in detail on the basis of preferred embodiments that are shown in the appended drawings.

Figure 1:
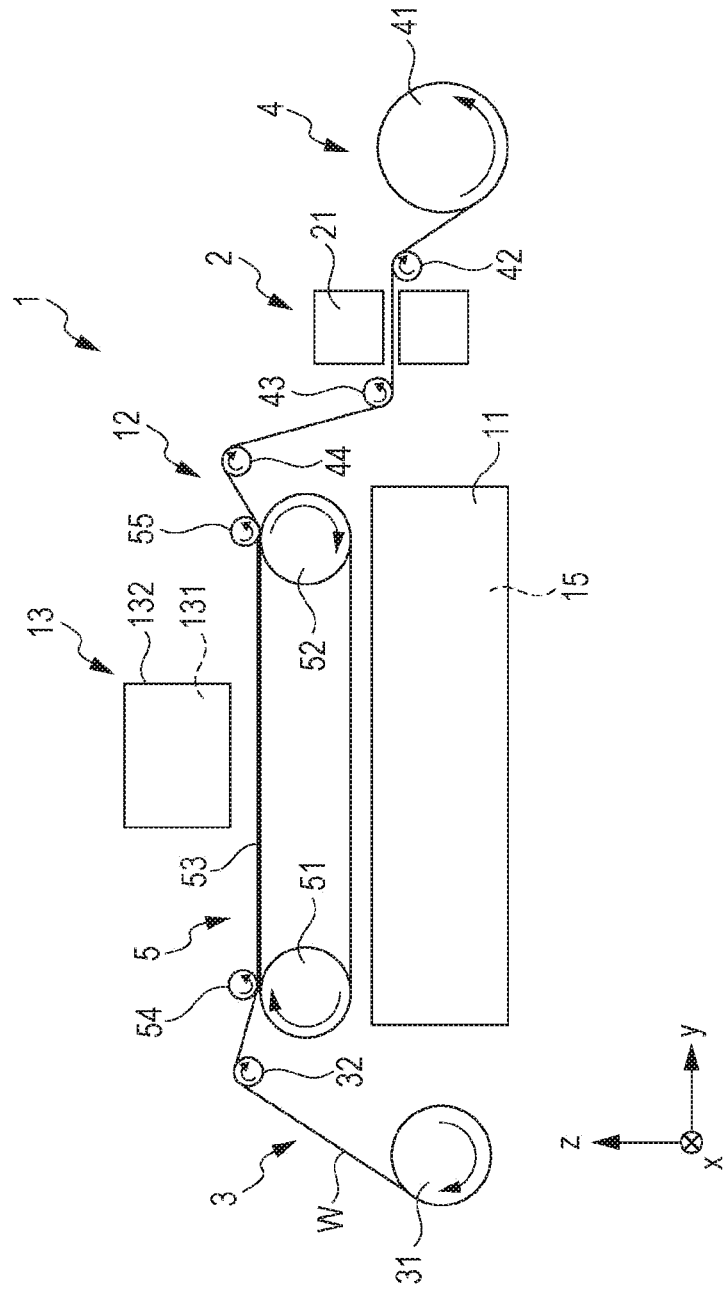
FIG. 1 is a side view that shows a preferred embodiment of a printing apparatus of the invention.
Figure 2:
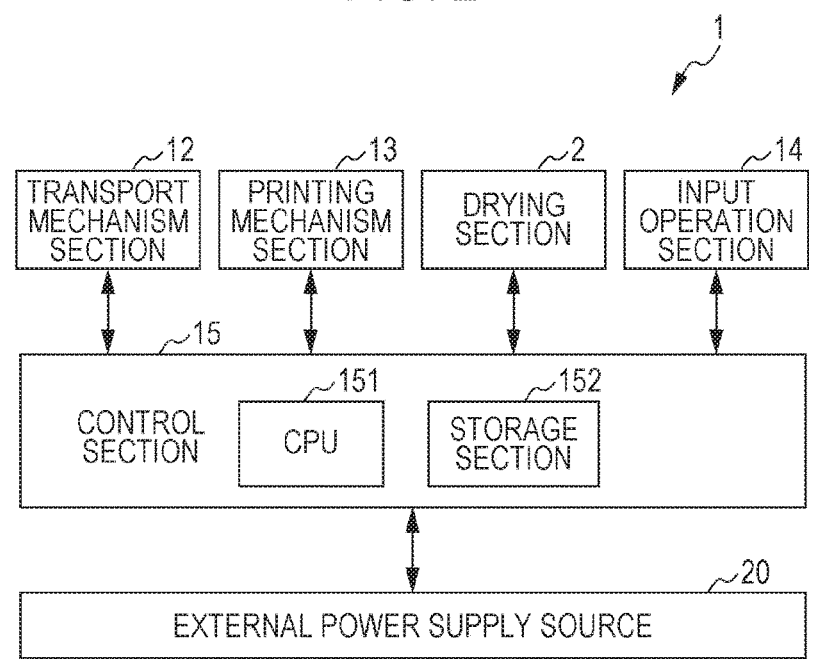
FIG. 2 is a block diagram of the main components of the printing apparatus that is shown in FIG. 1.
Figure 3:
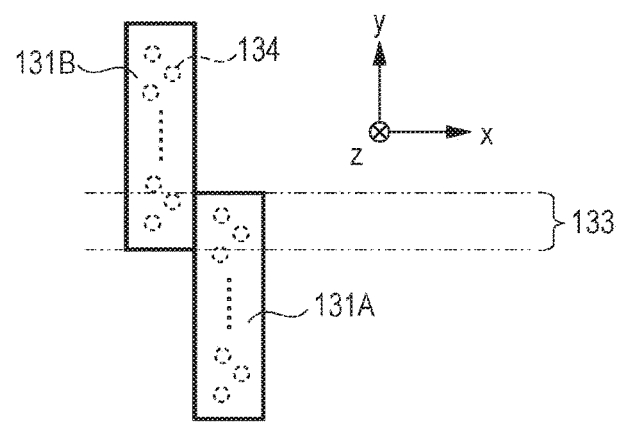
FIG. 3 is a plan view that shows an example of a disposition of a first head and a second head in a carriage unit, with which the printing apparatus that is shown in FIG. 1 is provided.
Figure 4:
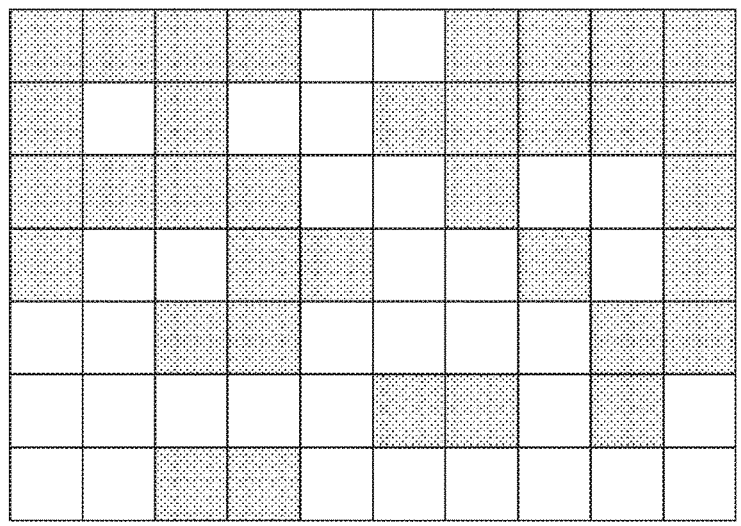
FIG. 4 is a partial enlarged view that shows an example of a dot disposition of ink from the first head in an outgoing path (a return path) of the carriage unit.
Figure 4:
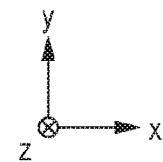
Figure 5:
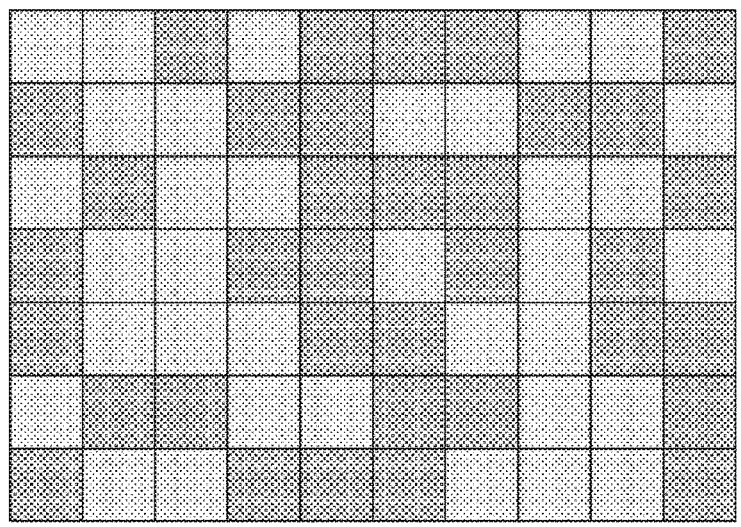
FIG. 5 is a partial enlarged view that shows an example of a dot disposition of ink from each nozzle in an overlapping region of the first head and the second head.
Figure 5:
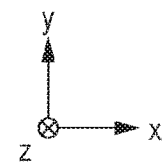

FIG. 1 is a side view that shows a preferred embodiment of a printing apparatus of the invention. FIG. 2 is a block diagram of the main components of the printing apparatus that is shown in FIG. 1. FIG. 3 is a plan view that shows a disposition of a first head and a second head in a carriage unit, with which the printing apparatus that is shown in FIG. 1 is provided. FIG. 4 is a partial enlarged view that shows an example of a dot disposition of ink from the first head in an outgoing path (a return path) of the carriage unit. FIG. 5 is a partial enlarged view that shows an example of a dot disposition of ink due to each nozzle in an overlapping region of the first head and the second head. Additionally, hereinafter, for convenience of description, a paper surface depth direction in FIG. 1 will be referred to as an "x axis direction", a left-right direction will be referred to as a "y axis direction", and an up-down direction will be referred to as a "z axis direction". In addition, the coordinate system axes in FIGS. 3 to 5 respectively correspond to the coordinate system axes in FIG. 1. In addition, the cells in FIGS. 4 and 5 show the disposition of dots of ink.

A printing apparatus 1 of the invention is an apparatus that carries out printing on work W, as a recording medium, while transporting the work W, and can execute a printing method of the invention.

As shown in FIG. 1 and FIG. 2, the printing apparatus 1 is provided with a machine platform 11, a transport mechanism section (a transport section) 12 that transports the work W, a printing mechanism section (a recording section) 13 that carries out printing by applying an ink Q onto the work W, a drying section 2 that dries the ink Q on the work W, an input operation section 14 in which the input and setting of various conditions is performed during printing, and a control section 15 that controls the respective actions of each section. In addition, in the printing apparatus 1, the control section 15 is electrically connected to an external power supply source 20.

In the present embodiment, a direction (a main scanning direction) that is orthogonal to a transport direction, in which the work W is transported, is the x axis direction, a direction (a sub-scanning direction) that is parallel to the transport direction is the y axis direction, and a direction that is orthogonal to the x axis direction and the y axis direction is the z axis direction.

The transport mechanism section 12 is provided with a reel-out device 3 that reels out the longitudinal work W, which is wound around in roll shape, a winding device 4 that winds up the work W, on which printing is finished, and a support device 5 that is installed on the machine platform 11, and that supports the work W during printing.

The reel-out device 3 is installed further on an upstream side than the machine platform 11 in a feed direction of the work W (the y axis direction). The reel-out device 3 includes a feed-out roller (a reel-out reel) 31 around which the work W is wound in roll shape, and that feeds the work W out, and a tensioner 32 that generates tension in the work W between the feed-out roller 31 and the support device 5. A motor (not illustrated in the drawings) is connected to the feed-out roller 31, and the feed-out roller 31 can rotate as a result of the action of the motor.

Additionally, as the work W, it is possible to use a thin film recording medium that has an ink-absorbing property, or a thin film recording medium that has a non-ink-absorbing property. In a case of the former, examples include normal paper, wood free paper, special purpose paper for ink jet recording such as glossy paper, and in addition to the above, a woven fabric, or the like. In a case of the latter, examples include a plastic film on which a surface treatment for ink jet printing has not been performed (that is, on which an ink-absorbing layer is not formed), a recording medium in which a plastic is coated onto, or in which a plastic film is bonded to a base material such as a paper. The corresponding plastic is not particularly limited, and for example, examples thereof include polyvinyl chloride, polyethylene terephthalate, polycarbonate, polystyrene, polyurethane, polyethylene, and polypropylene.

The winding device 4 is installed further on a downstream side than the machine platform 11 in a feed direction of the work W (the y axis direction) with respect to the reel-out device 3. The winding device 4 includes a winding roller (a winding reel) 41 onto which the work W is wound in roll shape, and tensioners 42, 43 and 44 that generate tension in the work W between the winding roller 41 and the support device 5. A motor (not illustrated in the drawings) is connected to the winding roller 41, and the winding roller 41 can rotate as a result of the action of the motor. The tensioners 42 to 44 are respectively disposed in this order at intervals in a direction of separation from the winding roller 41.

The support device 5 is disposed between the reel-out device 3 and the winding device 4. The support device 5 includes a main driving roller 51 and a driven roller 52, which are disposed separated from one another in the y axis direction, an endless belt 53, which is stretched between the main driving roller 51 and the driven roller 52, and tensioners 54 and 55 that generate tension in the work W between the main driving roller 51 and the driven roller 52.

A motor (not illustrated in the drawings) is connected to the main driving roller 51, and the main driving roller 51 can rotate as a result of the action of the motor. In addition, a rotational force of the main driving roller 51 is transmitted to the driven roller 52 via the endless belt 53, and the driven roller 52 can rotate in an interlocked manner with the main driving roller 51.

The endless belt 53 is a belt on which an adhesive layer, which has an adhesive property, is formed on a surface of an outer side thereof. A portion of the work W is adhered and fixed to the adhesive layer, and the work W is transported in the y axis direction. Further, printing is carried out on the work W during the transport. In addition, after the printing has been carried out, the work W peels away from the endless belt 53.

In the same manner as the main driving roller 51 and the driven roller 52, the tensioners 54 and 55 are disposed separated from one another in the y axis direction.

It is possible to interpose the work W between the tensioner 54 and the main driving roller 51 together with the endless belt 53, and it is possible to interpose the work W between the tensioner 55 and the driven roller 52 together with the endless belt 53. As a result of this, the work W, in which tension is generated by the tensioners 54 and 55, is fixed to the endless belt 53 and transported in a state in which the tension is generated. As a result of such a state, in the work W, for example, wrinkles, and the like, are prevented during transport, and accordingly, in a case in which printing is carried out, the printing is accurate and high-quality.

The printing mechanism section 13 is provided with a carriage unit 132, which has a plurality of ink jet heads 131 that perform recording through printing by discharging the ink Q onto the work W, and an X axis table (not illustrated in the drawings) that supports the carriage unit 132 in a manner in which the carriage unit 132 is capable of moving in the x axis direction. For example, each ink jet head 131 is respectively provided with a head main body, in which an internal head flow channel, an inner portion of which is filled with the ink Q, is formed, and a nozzle plate having a nozzle surface in which a multitude of nozzles 134 are opened. A piezoelectric element is configured in the head main body to correspond to each discharge nozzle, and when a voltage is applied to a piezoelectric element, the ink Q is discharged from a discharge nozzle as liquid droplets.

In the printing apparatus 1, the work W, which is reeled out by the reel-out device 3, is intermittently fed (sub-scanned) in the y axis direction in a fixed state of being adhered and fixed by the endless belt 53, and the ink Q is discharged from the ink jet heads 131 onto the work W in the fixed state, while the carriage unit 132 is reciprocated (main scanned) in the x axis direction. It is possible to perform the above-mentioned actions until printing is completed, and an image is formed on the work W. Additionally, an obtained image may be an image that results from polychromatic printing (color printing), or may be an image pattern that results from monochromatic printing.

As shown in FIG. 3, the carriage unit 132 is provided with a first head 131A and a second head 131B that discharge ink Q of the same color, as the ink jet heads 131.

The first head 131A and the second head 131B are adjacent to one another in the x axis direction. In addition, the first head 131A and the second head 131B are disposed so as to overlap with one another in the y axis direction.

Additionally, in the present embodiment, description is given focusing on two ink jet heads 131 that are the same color and are adjacent in the manner of the illustrated configuration, but in a practical sense, there may be a plurality of more than two ink jet heads 131, which discharge ink Q of the same color, or there may be a plurality of ink jet heads 131, which discharge ink Q of different colors.

In the reciprocation of the carriage unit 132, a region in which the first head 131A prints in an outgoing path (the right direction in FIG. 3), and a region in which the second head 131B prints in a return path (the left direction in FIG. 3) after intermittently feeding the work W, are configured to overlap with one another. As a result of this, when printing through intermittent feeding, it is possible to prevent a circumstance in which stripes are generated in the x axis direction.

In this overlapping region, a first image, which the first head 131A prints on the work W in the outgoing path, is configured so that the printing density thereof gradually decreases toward the upstream side in the transport direction of the work W.

More specifically, as shown in the dot disposition view of ink of FIG. 4, the first head 131A is configured to discharge the ink Q in dot positions, which are shown by grey cells of the work W in the outgoing path in the overlapping region. Further, the number of cells onto which the ink Q is discharged is configured so as to gradually decrease toward upstream (a lower direction in FIG. 4) in the transport direction of the work W. As a result of this, when printing through intermittent feeding, it is possible to prevent a circumstance in which variations in density occur due to shifting of landing positions in the y axis direction.

In addition, the first image, which is depicted by the first head 131A is configured to include a dot group, in which at least two dots are linked, due to ink in the x axis direction. As a result of this, it is possible to prevent a circumstance in which variations in density occur due to shifting of landing positions in the x axis direction.

As shown in the dot disposition view of ink of FIG. 4, this kind of dot group is formed by configuring so that the ink Q is discharged from the first head 131A onto dot positions (cells) that are adjacent in the x axis direction.

In addition, in the overlapping region of the region in which the first head 131A prints in the outgoing path, and the region in which the second head 131B prints in the return path after intermittently feeding the work W, a second image, which the second head 131B prints on the work W in the return path, is configured to supplement the decrease in printing density of the first image.

That is, in the return path in the overlapping region, the second head 131B is configured to discharge the ink Q in dot positions, which are shown by white cells in FIG. 4.

In addition, the second image, which is depicted by the second head 131B is configured to include a dot group, in which at least two dots are linked by ink in the x axis direction. As a result of this, it is possible to more reliably prevent a circumstance in which variations in density occur due to shifting of landing positions in the x axis direction.

As shown in the dot disposition view, which is shown by the white cells of ink in FIG. 4, this kind of dot group is formed such that the ink Q is discharged from the second head 131B onto dot positions (cells) that are adjacent in the x axis direction.

In addition, in a region 133 in which the first head 131A and the second head 131B overlap, a third image, which the first head 131A prints on the work W, and a fourth image, which the second head 131B prints on the work W, in either the outgoing path or the return path, have the same printing densities in the x axis direction, and to supplement one another.

More specifically, as shown in FIG. 5, the ink Q is discharged onto light grey cells from the first head 131A, and the ink Q is discharged onto the dark grey cells from the second head 131B. In FIG. 5, the number of light grey cells and dark grey cells is the same number in the x axis direction.

In addition, in the region 133, the first head 131A is configured to form the third image that includes a dot group in which two dots are linked in the x axis direction.

In addition, in the region 133, the second head 131B is configured to form the fourth image that includes a dot group in which two dots are linked in the x axis direction.

As a result of such a configuration, it is possible to more reliably suppress a circumstance in which variations in density occur due to shifting of landing positions in an image that is formed in the region 133.

The ink Q contains a dye or a pigment, as a coloring agent, in water, as a solvent, and for example, there are the four colors of cyan (C), magenta (M), yellow (Y) and black (K). Further, the ink Q of each color is respectively discharged from the ink jet heads 131 in an independent manner.

As shown in FIG. 1, the drying section 2 is disposed between the support device 5 and the winding roller 41 of the winding device 4, which is further on a downstream side than the printing mechanism section 13 in the transport direction of the work W. The drying section 2 includes a chamber 21, a heater which is disposed inside the chamber 21, and a voltage application section, which applies a voltage to the heater.

The chamber 21 includes an inlet, through which the work W having ink Q in an undried state, is input, and an outlet, through which the work W having ink Q in a dried state is output. In addition, a space between the inlet and the outlet is a throughpass channel through which the work W passes.

The heater is disposed facing the throughpass channel, and is electrically connected to the voltage application section. For example, the heater is a heat emitting member that is configured by an infrared heater, and power from the external power supply source 20 is supplied via the voltage application section without change. As a result of this, the voltage is applied, and as a result, it is possible for the heater to emit heat. Further, it is possible to dry ink Q in an undried state, which is on the work W that is passing through the throughpass channel using a result of the heat.

In addition, the tensioner 42 and the tensioner 43 are disposed on both side of the drying section 2 in the y axis direction. As a result of this, the work W can pass through the throughpass channel in a state in which tension is being applied thereto. As a result of such a state, in the work W, for example, a circumstance in which wrinkles, and the like, are generated, is prevented during passage, and accordingly, it is possible to reliably perform drying of the ink Q.

For example, the input operation section 14 is configured by a touch panel, or the like. An operator, who is a manipulator of the printing apparatus 1, can input various conditions during printing using the input operation section 14. The conditions are not limited, and examples thereof include a printing program, a transport velocity of the work W, a thickness, and the like. Additionally, the input operation section 14 also has a function of a display section that displays information of the printing apparatus 1.

The control section 15 is electrically connected to the transport mechanism section 12, the printing mechanism section 13, the drying section 2 and the input operation section 14, and has a function of respectively controlling the actions of the above-mentioned components. As shown in FIG. 2, the control section 15 includes a Central Processing Unit (CPU) 151, and a storage section 152.

The CPU 151 executes programs for various processes such as a printing process such as that mentioned above.

The storage section 152, for example, includes Electrically Erasable Programmable Read-Only Memory (EEPROM), which is a type of non-volatile semiconductor memory, or the like, and can store various programs, or the like.

The external power supply source 20, which applies a voltage of 200 V, for example, is electrically connected to the control section 15. As a result of this, a power is supplied to each section of the printing apparatus 1.

Embodiments of the drawings that show the printing apparatus and the printing method of the invention have been described above, but the invention is not limited to these embodiments, and it is possible to substitute each section that configures the printing apparatus for a section that has an arbitrary configuration that is capable of exhibiting the same function. In addition, arbitrary components may be added.

In addition, the printing apparatus and the printing method of the invention may have features of two or more arbitrary configurations (features) of each of the above-mentioned embodiments being combined.

This application claims priority under 35 U.S.C. §119 to Japanese Patent Application No. 2015-214618, filed Oct. 30, 2015. The entire disclosure of Japanese Patent Application No. 2015-214618 is hereby incorporated herein by reference.

What is claimed is:

1. A printing apparatus that carries out printing by discharging an ink onto a recording medium while transporting the recording medium, the printing apparatus comprising:
   a carriage unit that is disposed facing the recording medium, and that reciprocates in a main scanning direction, which intersects a transport direction of the recording medium,
   wherein the carriage unit includes
      a first head, which includes a plurality of first nozzles that are arranged in the transport direction of the recording medium and discharge the ink, and
      a second head, which includes a plurality of second nozzles that are arranged in the transport direction of the recording medium and discharge ink of the same color as the first nozzles,
   the second head is disposed so as to be adjacent to the first head in the main scanning direction, and to overlap with the first head in the transport direction of the recording medium,
   the first head is disposed on an upstream side in the transport direction of the recording medium with respect to the second head such that a print area by the first head in an outgoing path in the reciprocation of the carriage unit overlaps with a print area by the second head in a return path in the reciprocation of the carriage unit after transporting the recording medium in the transport direction,
   in the outgoing path in the reciprocation of the carriage unit, the first head is configured to print a first image on the overlapping print area of the recording medium with a printing density of the first image gradually decreasing toward the upstream side in the transport direction of the recording medium, and the first image includes a dot group, in which at least two dots formed using the ink that is discharged from the first nozzles are linked to one another in the main scanning direction, and
   in the return path in the reciprocation of the carriage unit, the second head is configured to print a second image, which supplements a decrease in the printing density of the first image, on the overlapping print area of the recording medium.

2. The printing apparatus according to claim 1, wherein the second image includes a dot group, in which at least two dots formed using the ink that is discharged from the second nozzles are linked to one another in the main scanning direction.

3. The printing apparatus according to claim 1, wherein, in a region in which the first head and the second head overlap, a third image, which the first head prints on the recording medium, and a fourth image, which the second head prints on the recording medium, in either the outgoing path or the return path, have the same printing densities in the main scanning direction and supplement one another,
   the third image includes a dot group, in which at least two dots formed using the ink that is discharged from the first nozzles are linked to one another in the main scanning direction, and
   the fourth image includes a dot group, in which at least two dots formed using the ink that is discharged from the second nozzles are linked to one another.

4. A printing method that carries out printing on a recording medium using the printing apparatus according to claim 1.

5. A printing method that carries out printing on a recording medium using the printing apparatus according to claim 2.

6. A printing method that carries out printing on a recording medium using the printing apparatus according to claim 3.

* * * * *